United States Patent [19]

Tholomé Roger et al.

[11] Patent Number: 4,672,500
[45] Date of Patent: Jun. 9, 1987

[54] PROTECTIVE DEVICE FOR ELECTROSTATIC SPRAYER EQUIPMENT

[75] Inventors: Tholomé Roger, Corenc; Jean-Pierre Burtin, Saint Egreve, both of France

[73] Assignee: Sames S.A., Meylan, France

[21] Appl. No.: 650,537

[22] Filed: Sep. 14, 1984

[30] Foreign Application Priority Data

Sep. 14, 1983 [FR] France .................. 83 14886

[51] Int. Cl.⁴ .............................................. H02H 3/00
[52] U.S. Cl. ........................................ 361/93; 361/42; 361/87; 361/235
[58] Field of Search ............... 361/42, 47–50, 361/87, 235, 93, 101, 227, 228; 323/276–278; 363/56

[56] References Cited

U.S. PATENT DOCUMENTS

| | | | |
|---|---|---|---|
| 3,894,272 | 7/1975 | Bentley | 361/42 |
| 3,996,496 | 12/1976 | Volk, Jr. | 361/50 |
| 4,187,527 | 2/1980 | Bentley | 361/235 |
| 4,402,030 | 8/1983 | Moser et al. | 361/42 X |
| 4,485,427 | 11/1984 | Woodruff et al. | 361/235 |

FOREIGN PATENT DOCUMENTS

| | | | |
|---|---|---|---|
| 1601577 | 8/1970 | France . | |
| 2060769 | 6/1971 | France . | |
| 2087672 | 5/1982 | United Kingdom | 361/235 |
| 2116386 | 9/1983 | United Kingdom . | |

*Primary Examiner*—Roy N. Envall, Jr.
*Assistant Examiner*—Derek S. Jennings
*Attorney, Agent, or Firm*—Sandler & Greenblum

[57] ABSTRACT

Electrostatic spraying equipment having, in a working area likely to contain inflammable mixtures, at least a terminal part of a high-voltage generator with an electrode for charging a jet of material sprayed from a sprayer. At least one low-voltage line connects the terminal part of the generator to a remotely sited power supply equipped with cut-out device. A protective device designed to prevent repeated arcing in the working area as a result of deterioration of the low-voltage line comprises, in series with the line, a sensing device for sensing a current lower than a predetermined minimum current. A control device responsive to the sensing device are connected to the aforementioned cut-out device so as to operate them when a current in the line lower than the predetermined minimum is sensed.

13 Claims, 2 Drawing Figures

PROTECTIVE DEVICE FOR ELECTROSTATIC SPRAYER EQUIPMENT

BACKGROUND OF THE INVENTION

1. Field of the Invention

The invention concerns a protective device for electrostatic sprayer equipment comprising, in a working area likely to contain inflammable mixtures, at least a terminal part of a high-voltage generator with an electrode for electrostatically charging a jet of sprayed material, at least one low-voltage electrical line connecting the terminal part of the high-voltage generator to a remotely sited electrical power supply equipped with cut-out means.

2. Description of the prior art

The use of high-voltage DC generators for supplying electrostatic sprayer equipment is well known as is the risk of ignition of the sprayed products or the vapors thereof as a result of the accidental production of electrical arcs, for example between the high-voltage electrode of the sprayer apparatus and the object to be sprayed, which is generally grounded. The risk is proportional to the quantity of electrostatic energy stored in the capacitance consisting of the high-voltage electrode, the output terminal of the generator and the cable connecting these. When the generator is sited far from the sprayer apparatus, at a distance of around ten meters, for example, the greater part of this capacitance consists of the connecting cable. The risk of arcing due to the capacitance of the cable is often reduced by inserting a damper resistance between it and the high-voltage electrode of the sprayer apparatus; if the capacitance of said electrode is low this protection is sufficient. If not, or in order to take account also of the risk of deterioration of the insulation of the high-voltage connecting cable, there is placed in the high-voltage circuit, generally between the ground terminal of the generator and the ground connection, a detector responsive to a current surge or to a rapid increase in the current and which, when it detects an anomaly in the high-voltage current, shuts down the high-voltage generator and connects its high-voltage terminal to ground in order to discharge rapidly to ground the capacitance which is charged to the high voltage. Another proposed solution is to reduce the capacitance charged to the high voltage by eliminating the connecting cable and juxtaposing the generator and the sprayer apparatus. This solution eliminates the risk associated with the capacitance of the high-voltage cable but not that associated with the capacitance of the high-voltage electrode of the sprayer apparatus. It has consequently been proposed, in particular in U.S. Pat. No. 4,187,527, to proceed as previously and to provide between the ground terminal of the high-voltage generator and the ground connection, in the high-voltage circuit, a detector responsive to an increase in the current by shutting down the generator and grounding the high-voltage electrode. As the generator may be grounded far away from the sprayer apparatus, in an area containing no combustible mixture, the high-voltage current increase detector is located in such an area and thus does not present any risk.

Other risks result from this solution, however. Even though the low-voltage input of the high-voltage generator and the device for grounding the high-voltage electrode are designed and constructed in such a way as to eliminate the risk of electrical arcing, it is difficult to protect effectively the low-voltage cables connecting them to their respective power supplies against this risk without making them stiff and heavy. This is unacceptable when the sprayer apparatus is mobile and light in weight, if it is mounted on a manipulator possessing several degrees of freedom, for example. Nor is it possible to limit the energy available in these low-voltage cables, for example by making them intrinsically safe using Zener barriers, since the power to be transmitted is too high. As this power is generally transmitted as a current of approximately one ampere with a voltage of several tens of volts, the risk of short-circuiting between the conductors of the low-voltage cables carrying these currents is easily eliminated by using maximum current circuit-breakers and/or fast-blow fuses. This does not apply to the risk of intermittent interruption of the circuits constituted by these cables, for example as a result of the rupture of a conductor due to fatigue resulting from the alternate bending imposed on it when manipulated. These intermittent interruptions do not result in current surges which can be detected by the aforementioned devices but they can nevertheless produce electrical arcs able to ignite inflammable mixtures as a result of the self-inductance and/or capacitance of the circuits in question.

SUMMARY OF THE INVENTION

In electrostatic sprayer equipment comprising a high-voltage generator, a sprayer, an electrode adapted to charge a jet of material sprayed from said sprayer, an electrical power supply adapted to be sited remotely of said generator, cut-out means equipping said electrical power supply, and at least one low-voltage line adapted to connect said generator to said electrical power supply, the invention consists in a protective device which comprises means connected in series with said line and adapted to sense the electric current therein, and control means which are responsive to said sensing means, connected to said cut-out means and adapted to operate said cut-out means when said sensing means sense a current lower than a predetermined minimum current.

Thus when a rupture in a conductor of the power supply line first appears, with intermittent breaks in continuity, the resulting reductions in the current, sensed by the sensing means, lead to the intervention of the control means which activate the cut-out means to prevent the occurrence of repeated arcing.

The electrical power supply is preferably adapted to supply a unidirectional electric current. The sensing means may then comprise a threshold comparator and a resistor adapted to be connected in series with the line and to an input of the threshold comparator.

A preferred embodiment comprises short-circuiting means shunting the line and adapted to be operated by the control means in conjunction with the cut-out means, so as to discharge the line when the supply is cut off.

When the electrode for charging the jet of sprayed material is equipped with electrically controlled grounding means, the control line for the grounding means is protected by a device analogous to that of the line supplying the terminal part of the high-voltage generator.

Other objects and advantages will appear from the following description of an example of the invention, when considered in connection with the accompanying drawings, and the novel features will be particularly pointed out in the appended claims.

GENERAL DESCRIPTION OF THE PREFERRED EMBODIMENT

Figure 1:
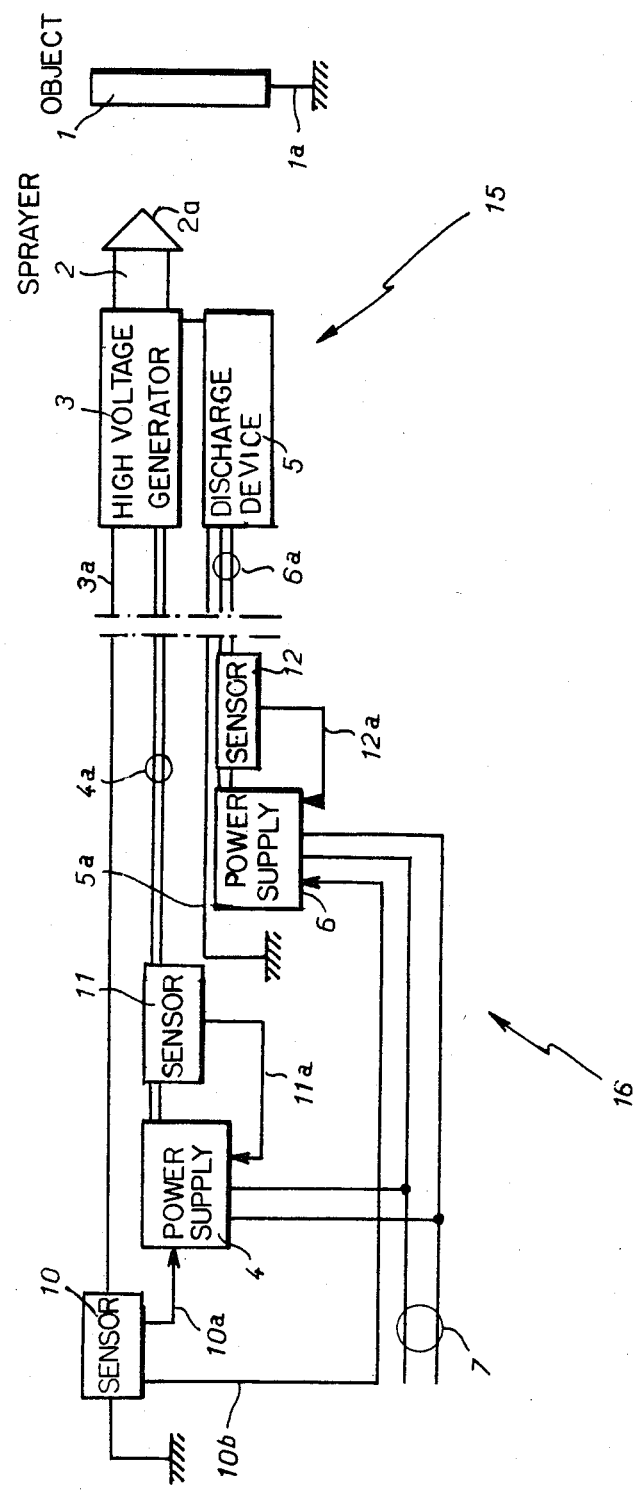
FIG. 1 is a schematic representation showing the organization of a device in accordance with the invention.

In the embodiment shown in FIG. 1, opposite an object 1 to be sprayed and which is grounded through a line 1a, there is disposed electrostatic sprayer apparatus 2 supplied with a high DC voltage by a generator 3 which is itself grounded via a line 3a and receives power from a power supply 4 via a low-voltage line 4a. A device 5 for rapidly discharging a high-voltage electrode 2a of the sprayer apparatus 2 is grounded via the rapid discharge device 5 a line 5a and receives electrical power from a power supply 6 via a low-voltage line 6a. The low-voltage power supplies 4 and 6 receive power from a voltage source (not shown) via a line 7.

A first sensor 10 senses any variation in or hazardous value of the high-voltage current in the grounding line 3a for the generator 3. This device 10 controls the low-voltage supply 4 of the generator 3 via a line 10a and the low-voltage supply 6 of the fast discharge device 5 via a line 10b, in the known manner. A second sensor 11 senses any variation in or hazardous value of the low-voltage current in the line 4a and controls the low-voltage power supply 4 via a line 11a.

In a similar manner, a third sensor device 12 senses any variation in or hazardous value of the low-voltage current in the line 6a and controls the low-voltage power supply 6 via a line 12a.

The object to be sprayed, the sprayer apparatus, the high-voltage generator and the device for rapidly discharging the high-voltage electrode are situated in an area 15 which may contain inflammable mixtures, whereas the other component parts of the installation such as the power supplies and the sensors are situated in an area 16 which does not contain any such mixtures, the connections between these two groups of components being made by the ground lines 3a and 5a and the low-voltage lines 4a and 6a.

OPERATION

If the object 1 to be sprayed comes too close to the high-voltage electrode of the sprayer 2 there results an increase in the high-voltage current in the line 3a which is sensed, in a manner known per se, by the sensor 10 which, over the line 10a, shuts down the low-voltage power supply 4 of the high-voltage generator 3 and causes, via the line 10b, the low-voltage power supply 6 and the low-voltage line 6a, the grounding of the high-voltage electrode 2a of the sprayer 2 via the discharge device 5 and line 5a. If the low-voltage power line 4a supplying the high-voltage generator 3 and/or the low-voltage power line 6a supplying the discharge device is interrupted, as a result of repeated movement of the sprayer-generator-discharge device combination, for example, the circuits consisting of these lines 4a and 6a are intermittently interrupted because of these movements of the aforementioned combination and electrical arcs may be struck at the position of any interruptions situated in the danger area 15. The sensors 11 and 12 respectively sense these interruptions, and in particular the sudden drops in the current corresponding thereto, and respectively shut down the low-voltage power supplies 4 and 6, where necessary short-circuiting the conductors of the lines 4a and 6a so as to dissipate outside the danger area 15 any energy stored therein in inductive or capacitive form.

DETAILED DESCRIPTION OF SENSOR

Figure 2:
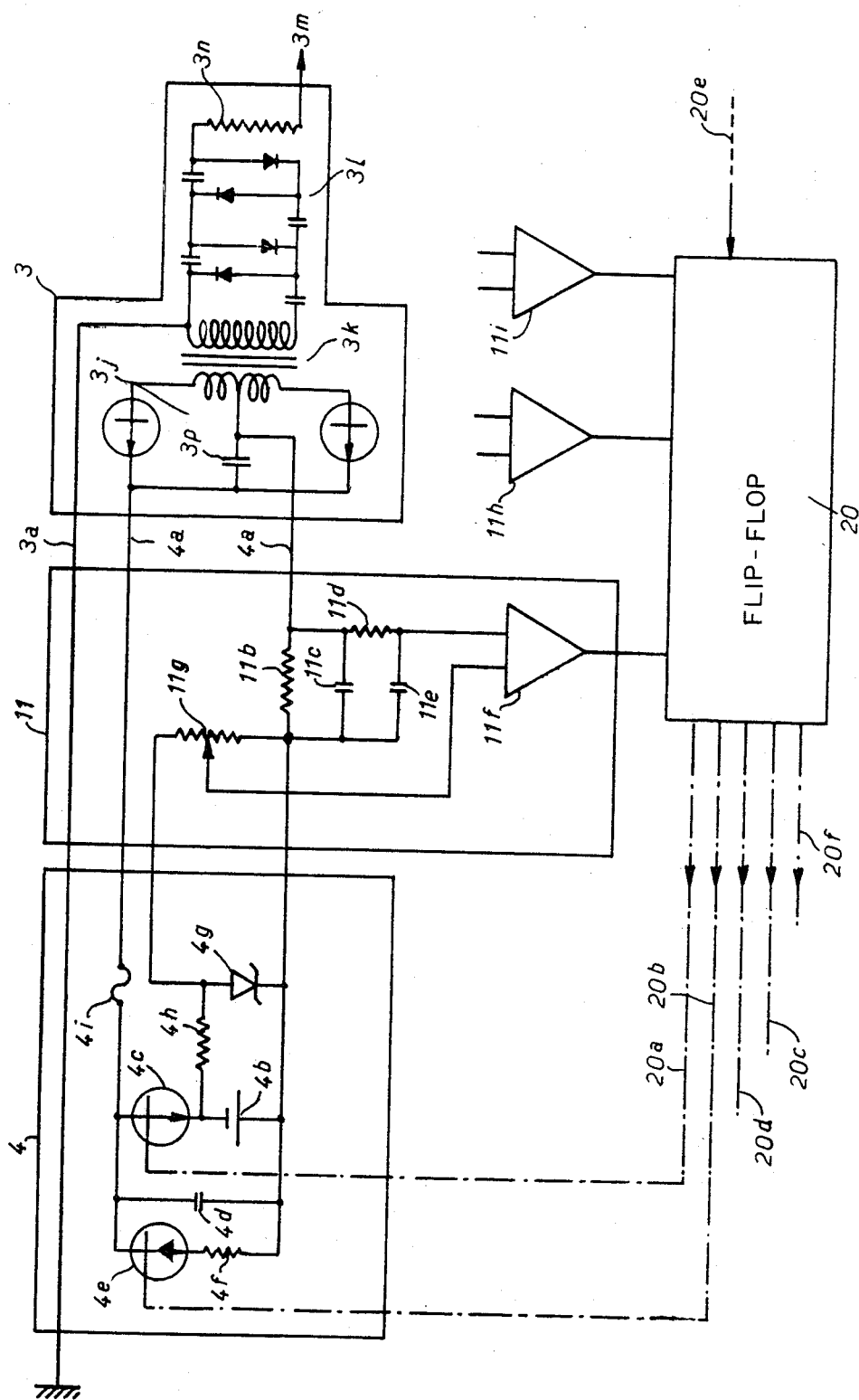
FIG. 2 is a circuit schematic of one embodiment of the device in accordance with the invention.

Referring to FIG. 2, the high-voltage generator 3 consists primarily of a class C oscillator 3j, a high-voltage transformer 3k and a voltage multiplier 3l. It applies a high DC voltage to the terminal 3m through a damper resistor 3n. It is grounded via a line 3a. A capacitor 3p produces the current spikes necessary for the oscillator to function.

The oscillator 3j is supplied with a DC voltage, affected by pulses to a greater or lesser extent, by the power supply 4 via the 2-wire line 4a. The power supply 4 primarily comprises a DC voltage source, symbolically represented here as a battery 4b, a ballast transistor 4c, a capacitor 4d, a discharge transistor 4e and its protective resistor 4f. The power supply also comprises a Zener diode 4g and a resistor 4h for stabilizing the supply to the device 11. A fast-blow fuse 4i protects the line 4a against current surges, due to a short-circuit between its conductors, for example. The device 11 comprises a sensing circuit consisting of a resistor 11b and a coupling capacitor 11c for the AC component, a filter consisting of a resistor 11d and a capacitor 11e, and an operational amplifier 11f which compares the voltage obtained across the capacitor 11e with a DC reference voltage provided by a potentiometer 11g, supplied through the resistor 4h and the Zener diode 4g. A flip-flop 20 is driven by the operational amplifier 11f and where applicable by other amplifiers 11h, 11i controlled by other (not shown) sensing devices. This flip-flop 20 controls via a line 20a the transistor 4c supplying the oscillator 3j and via a line 20b the transistor 4e for discharging the capacitors 3p and 4d as well as the capacitance of the line 4a. Via other lines 20c and 20d, for example, flip flop 20 operates likewise on the power supply 6 of the device 5 for discharging the high-voltage electrode 2a of the sprayer 2. An external control line 20e provides for deliberate disabling of the flip-flop 20 where variation of the current in the line 4a is expected, for example on starting up, adjusting or shutting down the high-voltage generator 3. A line 20f is provided for activating an indicator device to show that the device has operated.

OPERATION

When the (possibly pulsed) DC current in the line 4a is normal, the comparison of the voltages sensed by the circuits 11b, 11c, 11d, 11e with the DC voltage set by the potentiometer 11g maintains the amplifier 11f and the flip-flop 20 in a state such that the power supply 4 may continue to supply the normal current. If the line 4a is subject to one or more interruptions between the device 11 and the generator 3, there occur rapid and significant reductions in the current resulting in reductions in the voltage applied to the amplifier 11f. These voltage drops, amplified by the amplifier, cause the flip-flop 20 to change state. This in turn shuts down the power supply 4 by switching off the transistor 4c via the line 20a and discharges the capacitors 3p and 4d and the capacitance of the line 4a by switching on the transistor 4e. By means of lines 20c and 20d, this change of state may also bring about similar effects at the power supply 6 for the discharge device 5. It also activates an alarm signal over the line 20f. The components of the electrical circuits are selected for the fastest possible response time while eliminating spurious reaction to interference in the low-voltage circuit under normal operating conditions. In this way response times of the order of a few milliseconds have been routinely obtained.

It will be understood that various changes in the details, materials and arrangements of parts which have been herein described and illustrated in order to explain the nature of the invention may be made by those skilled in the art within the principle and scope of the invention as expressed in the appended claims.

We claim:
1. Electrostatic sprayer equipment comprising:
    (a) a high-voltage generator;
    (b) a sprayer operatively connected to said high-voltage generator;
    (c) an electrode for charging a jet of material from said sprayer;
    (d) an electrical power supply for supplying power to said high-voltage generator, said electrical power supply being sited remotely from said high-voltage generator;
    (e) cut-out means for cutting off power from said electrical power supply;
    (f) at least one low-voltage line for connecting said high-voltage generator to said electrical power supply; and
    (g) a protective device for operating said cut-out means when a lower than threshold current is sensed in said at least one low-voltage line.
2. The electrostatic sprayer equipment according to claim 1 wherein said protective device comprises:
    (a) sensing means connected in series with said at least one low-voltage line for sensing current in said at least one low-voltage line; and
    (b) control means connected to said cut-out means, said control means being responsive to said sensing means to operate said cut-out means to cut off power from said electrical power supply wherein said cut-out means is operated when said sensing means senses a current lower than said threshold current.
3. The electrostatic sprayer equipment according to claim 2 wherein said electrical power supply supplies a unidirectional electric current.
4. The electrostatic sprayer equipment according to claim 3 wherein said sensing means comprises:
    (a) a threshold comparator having at least one input; and
    (b) a resistor adapted to be connected in series with said at least one low-voltage line and to said at least one input of said threshold comparator.
5. The electrostatic sprayer equipment according to claim 2 further comprising short-circuiting means operated by said control means in response to detection of current less than said threshold current for shunting said at least one low-voltage line and effecting safe discharge of capacitance.
6. The electrostatic sprayer equipment according to claim 3 wherein said control means comprises a flip-flop having a disable input for disabling said flip-flop prior to starting or, during adjusting or shutting down the generator.
7. The electrostatic sprayer equipment according to claim 3 further comprising:
    (a) means for grounding said electrode;
    (b) a low-voltage control line connected to said means for grounding; and
    (c) means connected to said low-voltage control line and said control means for detecting a minimum current.
8. Electrostatic sprayer equipment comprising:
    (a) a sprayer for spraying material;
    (b) a high-voltage generator operatively connected to said sprayer for charging the material sprayed by said sprayer;
    (c) an electrical power supply adapted to supply power to said high-voltage generator;
    (d) at least one low-voltage line connected between said high-voltage generator and said electrical power supply;
    (e) first means for detecting current in said at least one low-voltage line; and
    (f) safety means responsive to said first means for detecting to interrupt the flow of power from said electrical power supply to said high-voltage generator when said current in said at least one low-voltage line is lower than a predetermined threshold.
9. The electrostatic sprayer equipment according to claim 8 further comprising:
    (a) an electrode for charging a jet of material from said sprayer;
    (b) grounding means for selectively grounding said electrode;
    (c) at least one low-voltage control line connected to said grounding means;
    (d) second means for detecting current in said at least one low-voltage control line, and wherein said safety means is responsive to said second means for detecting to interrupt the flow of power to said at least one low-voltage control line and said at least one low-voltage when said current in said at least one low-voltage control line is lower than a predetermined threshold.
10. The electrostatic sprayer equipment according to claim 9 wherein said electrical power supply sits remotely from said high-voltage generator.
11. The electrostatic sprayer equipment according to claim 10 further comprising cut-out means operated by said safety means in response to detection of a current lower than said predetermined threshold for interrupting power from said high-voltage power supply, said cut-out means comprising at least one transistor.
12. The electrostatic sprayer equipment according to claim 11 further comprising short-circuiting means operated by said safety means in response to detection of current less than said threshold current for shunting said at least one low-voltage line and effecting safe discharge of capacitance.
13. The electrostatic sprayer equipment according to claim 13 wherein said safety means comprises a flip-flop having a disable input for disabling said flip-flop prior to starting or, during adjusting or shutting down the generator

* * * * *

UNITED STATES PATENT AND TRADEMARK OFFICE
CERTIFICATE OF CORRECTION

PATENT NO. : 4,672,500

DATED : June 9, 1987

INVENTOR(S) : Roger THOLOME et al.

It is certified that error appears in the above-identified patent and that said Letters Patent is hereby corrected as shown below:

At the front page, Item [75] Inventors, change "Tholomé Roger" to ---Roger Tholomé---.

At column 1, line 35, insert ---also--- between "to" and "take"; and delete "also of" after "account".

At column 3, line 21, insert ---and--- between "5" and "a line 5a".

At column 6, line 60, change "13" to ---12---.

At column 6, line 63, add a ---.--- after "generator".

Signed and Sealed this

Fourth Day of October, 1988

Attest:

DONALD J. QUIGG

*Attesting Officer*  *Commissioner of Patents and Trademarks*